(12) United States Patent
Timmroth et al.

(10) Patent No.: US 10,703,882 B2
(45) Date of Patent: Jul. 7, 2020

(54) PLASTIC COMPOSITION, PRODUCTION METHOD, AND USE OF SAME

(71) Applicant: ATP AICHER + TRÖBS PRODUKTENTWICKLUNG GMBH, Teisendorf (DE)

(72) Inventors: René Timmroth, Ainring (DE); Helmut Aicher, Neukirchen (DE); Stefan Tröbs, Oberteisendorf (DE)

(73) Assignee: ATP AICHER + TROBS PRODUKTENTWICKLUNG GMBH, Teisendorf (DE)

( * ) Notice: Subject to any disclaimer, the term of this patent is extended or adjusted under 35 U.S.C. 154(b) by 0 days.

(21) Appl. No.: 16/483,402

(22) PCT Filed: Jan. 23, 2018

(86) PCT No.: PCT/EP2018/051589
§ 371 (c)(1),
(2) Date: Aug. 2, 2019

(87) PCT Pub. No.: WO2018/141587
PCT Pub. Date: Aug. 9, 2018

(65) Prior Publication Data
US 2020/0010646 A1    Jan. 9, 2020

(30) Foreign Application Priority Data
Feb. 3, 2017   (DE) .................. 10 2017 001 013

(51) Int. Cl.
| | |
|---|---|
| C08K 13/02 | (2006.01) |
| C08F 110/02 | (2006.01) |
| C08J 3/20 | (2006.01) |
| C08K 3/08 | (2006.01) |
| C08K 5/05 | (2006.01) |
| C08K 5/053 | (2006.01) |
| C08K 5/098 | (2006.01) |

(52) U.S. Cl.
CPC ............ *C08K 13/02* (2013.01); *C08F 110/02* (2013.01); *C08J 3/203* (2013.01); *C08K 3/08* (2013.01); *C08K 5/05* (2013.01); *C08K 5/053* (2013.01); *C08K 5/098* (2013.01); *C08K 2003/0812* (2013.01); *C08K 2201/005* (2013.01)

(58) Field of Classification Search
USPC ........................................................ 524/397
See application file for complete search history.

(56) References Cited

U.S. PATENT DOCUMENTS 6,881,772 B2   4/2005   Gugumus

FOREIGN PATENT DOCUMENTS

| | | |
|---|---|---|
| DE | 19859194 A1 | 6/1999 |
| DE | 102015015276 A1 | 2/2017 |
| EP | 0661341 A1 | 7/1995 |

OTHER PUBLICATIONS

ISA European Patent Office, International Search Report Issued in Application No. PCT/EP2018/051589, dated Apr. 30, 2018, WIPO, 4 pages.

*Primary Examiner* — Fred M Teskin
(74) *Attorney, Agent, or Firm* — McCoy Russell LLP

(57) ABSTRACT

A plastic composition containing
at least one weakly polar or apolar thermoplastic polymer;
at least one metallic salt of an unsaturated aliphatic fatty acid;
at least one first mediator which is a hydrocarbon compound having at least one cyclic group and having at least one polar substituent comprising an oxygen atom and/or nitrogen atom, wherein the first mediator comprises at least two cyclic groups per polar substituent, and wherein the melting point of the first mediator is no more than 80° C. below and no more than 50° C. above the melting point of the thermoplastic polymer; and
at least one third mediator which is a hydrocarbon compound having at least one cyclic and preferably aromatic group which is unsubstituted or halogen-substituted, wherein the boiling point of the third mediator is no more than 100° C. below and no more than 80° C. above the melting point of the thermoplastic polymer.

17 Claims, No Drawings

PLASTIC COMPOSITION, PRODUCTION METHOD, AND USE OF SAME

CROSS-REFERENCE TO RELATED APPLICATION

The present application is a U.S. National Phase of International Patent Application Serial No. PCT/EP2018/051589 entitled "PLASTIC COMPOSITION, PRODUCTION METHOD, AND USE OF SAME" filed on Jan. 23, 2018. International Patent Application Serial No. PCT/EP2018/051589 claims priority to German Patent Application No. 10 2017 001 013.7, filed on Feb. 03, 2017. The entire contents of each of the above-cited applications are hereby incorporated by reference for all purposes.

TECHNICAL FIELD

The invention relates to a highly filled plastic composition, to a method of manufacturing the highly filled plastic composition, and to the use of such a highly filled plastic composition.

BACKGROUND AND SUMMARY

The use of a filled plastic composition for manufacturing functional components is known from the prior art. Such compositions typically comprise a plastic matrix and a filler material.

A high amount of filler material is desirable to improve some properties of such functional components. An increasing amount of filler material can, for example, produce an increase or a greater value of the thermal conductivity, of the density, of the magnetic properties, or of the screening effect with respect to electromagnetic signals and ionizing radiation. A great improvement of some properties can in particular be observed when the amount of filler material is close to the theoretical maximum since the number of particle contacts increases greatly in this range. It is possible to speak of a proximity to the theoretical maximum when the volume fraction of the filler material comes close to the volume fraction of the native filler material particles with a maximum packing density. The volume fraction of the native filler material particles at a maximum packing density results directly from the particle size distribution.

On the other hand, as the amount of filler material increases, the melt viscosity of the plastic compositions also rises, whereby high-filled compositions of this type are not accessible to every processing technology. Whereas molding compounds and casting compounds can be highly loaded with filler material in part at the cost of design freedom, highly filled plastic compositions are often not suitable for a processing within the framework of a variable injection molding process or extrusion process. Furthermore, some mechanical properties of the components are degraded by a high amount of filler material and the highly filled components tend to be brittle.

It is the object of the invention to provide plastic compositions that are as highly filled as possible that can be processed within the framework of an injection molding process or extrusion process and that additionally have acceptable mechanical properties.

DETAILED DESCRIPTION

Against this background, the invention relates to a highly filled plastic composition comprising (a) at least one polyolefin; (b) at least one metallic salt of an unsaturated aliphatic fatty acid; (c1) at least one first mediator which is a hydrocarbon compound having at least one cyclic and preferably aromatic group and having at least one polar substituent comprising an oxygen atom and/or nitrogen atom, wherein the first mediator comprises at least two and at most ten cyclic groups per polar substituent, and wherein the melting point of the first mediator is no more than 80° C. below and no more than 50° C. above the melting point of the polyolefin (a); (c2) optionally at least one second mediator which is different from the first mediator (c1) and is a hydrocarbon compound having at least one cyclic and preferably aromatic group and having at least one polar substituent comprising an oxygen atom and/or nitrogen atom, wherein the second mediator comprises fewer than two cyclic groups per polar substituent and preferably at least two and at most ten polar substituents per cyclic group, and wherein the melting point of the second mediator is no more than 80° C. below and no more than 50° C. above the melting point of the polyolefin (a); (d) and at least one third mediator which is a hydrocarbon compound having at least one cyclic and preferably aromatic group which is unsubstituted or halogen-substituted, wherein the boiling point of the third mediator is no more than 100° C. below and no more than 80° C. above the melting point of the polyolefin (a); and (e) at least one particulate filler material.

The boiling point at normal pressure is to be understood as the boiling point.

The filled composition can be present in pellet form to be able to be processed, for example, within the framework of an extrusion process or injection molding process. The composition can furthermore be present as a solid component that can be obtained, for example, using an extrusion process or an injection molding process.

The filler material portion of the highly filled plastic composition amounts to more than 40 vol %, measured at the total volume of the filled composition. In a preferred embodiment, the amount of filler material is more than 50 vol %. In a further preferred embodiment, the amount of filler material is more than 60 vol %.

In an embodiment, the particular filler material (e) has a monomodal distribution of the particle sizes. In an alternative embodiment, the filler material has a multimodal distribution of the particle sizes.

The invention includes the idea that the amount of filler material in the highly filled plastic composition is close to the theoretical maximum that results from the particle size distribution. With filler materials having a monomodal distribution of the particle sizes, the theoretical maximum is typically lower (for example at 65 vol % there) than with filler materials having a multimodal distribution of the particle sizes (at 75 vol % there, for example). It has been recognized that a number of physical properties of highly filled plastic compositions, for example their thermal conductivity, depend less on the absolute amount of filler material than on the proximity of the amount of filler material to the theoretical maximum. The effect is presumably based on the fact that these effects are decisively influenced by the number of particle contacts of the filler material and that this number increases greatly close to the theoretical maximum.

Provision is therefore made that the amount of filler material in the plastic composition amounts to at least 80 vol %, preferably at least 90 vol %, and further preferably at least 95 vol %, of the theoretical maximum.

The unfilled plastic composition can be combined under the term "organic material". In highly filled plastic compositions in accordance with the invention or in plastic compositions in accordance with the invention filled close to the packing limit, it is assumed that the first mediator (c1) and optionally furthermore the second mediator (c2) contributes to an increase in the melt volume and to a degradation of the melt viscosity during the processing, that the first mediator (c1) and optionally furthermore the second mediator (c2) in the completed component contributes to an increase in the affinity or bond strength between the organic material and the filler material, that the third mediator (d) forms a gas phase during the processing and thus further increases the volume of the organic material and further degrades the viscosity, and that the salt (b) contributes to a homogenization of the mixture.

In an embodiment, the filler material (e) is a metal powder, metal oxide powder, an oxide ceramic powder, a non-oxide ceramic powder, or a carbon powder. The use of mixtures comprising such powders is also conceivable and covered by the invention.

The filler material particles preferably have a spherical or granular design. In an embodiment, the average grain diameter of the filler materials is between 1 μm and 150 μm, preferably between 20 μm and 100 μm. The average grain diameter of the filler materials can be determined by sieve analysis in accordance with DIN 66165, for example.

In an embodiment, the melting point of the first mediator (c1) is no more than 50° C. below and/or no more than 30° C. above the melting point of the polyolefin (a).

In an embodiment, the melting point of the second mediator (c2) is no more than 50° C. below and/or no more than 30° C. above the melting point of the polyolefin (a).

In an embodiment, the melting point of the third mediator (d) is no more than 70° C. below and/or no more than 50° C. above the melting point of the polyolefin (a).

The specified general, and preferred maximum, boiling point and melting point differences between the ingredients (a), (c1), (c2), and (d) have the background that, on the one hand, the polyolefin (a), the first mediator (c1), and, where present, also the second mediator (c2) should be present in a melted state during the processing and the third mediator (d) should be present in gaseous form during the processing, and that, on the other hand, none of the substances should decompose. The fact that the boiling point of the third mediator (d) can be up to 100° C. below the melting point of the polyolefin (a) at normal pressure is due to the fact that local pressures of multiple bar can possibly be adopted during the processing that result in an increase of the boiling point.

In an embodiment, the polyolefin (a) has an average molar mass of between $10^4$ and $10^6$ g/mol. The average molar mass of suitable polyolefins (a) can, for example, be between 50,000 and 500,000 g/mol.

In an embodiment, the melting point of the polyolefin (a) is between 100° C. and 250° C.

In an embodiment, the polyolefin (a) is a semicrystalline polymer having a degree of crystallinity of less than 90%. The degree of crystallinity can, for example, be between 30 and 80%.

In an embodiment, the polydispersity of the polyolefin (a) is less than 5.

Suitable polyolefins (a) comprise polyethylene, polypropylene, polymethylpentene, polyisoprene, polybutylene, polyisobutylene, as well as copolymers and mixtures thereof. Polyethylene is particularly preferred.

The polyolefin (a) can be modified, for example oxidized, grafted or silanized. Unsubstituted polyolefins without heteroatoms are preferred, however.

In an embodiment, the fatty acid of the salt (b) is a monovalent carboxylic acid having more than 8 carbon atoms and at least one double bond. The carboxylic acids preferably comprise fewer than 25 carbon atoms. The preferred number of double bonds is preferably between 1 and 5. The number of carbon atoms can amount to between 15 and 20, for example. The number of double bonds can amount to 1 or 2, for example. Suitable carboxylic acids include oleic acid and linoleic acid. The cation of the salt can, for example, be an alkali metal, in particular sodium or potassium.

In an embodiment, the proportion of the salt (b) in the unfilled composition, i.e. in the organic material, amounts to between 1 and 15% by weight. Preferred ranges include proportions of more than 3% by weight and of less than 7% by weight.

In an embodiment, the first mediator (c1) comprises hydroxy groups and/or amino groups as polar substituents. In an embodiment, all the polar substituents of the first mediator (c1) are hydroxy groups and/or amino groups, preferably hydroxy groups.

In an embodiment, the first mediator has 1 to 4 (c1) polar substituents and preferably hydroxy groups.

In an embodiment, the first mediator (c1) is a polycyclic aromatic alcohol.

Examples of suitable first mediators (c1) include triphenylmethanol, diphenylmethanol, 4-nitrobenzenemethanol, diphenylether, 1,2,4-triphenylsilanol, hydroxybiphenyl, 3-hydroxybiphenyl, 2-hydroxybiphenyl, α-cyclohexyl-α-phenyl-1-piperidinepropanol, 4-cyclohexylphenol, 2-cyclohexylphenol, and dibenzylamine.

In an embodiment, the second mediator (c2) comprises hydroxy groups and/or amino groups as polar substituents. In an embodiment, all the polar substituents of the second mediator (c2) are hydroxy groups and/or amino groups, preferably hydroxy groups.

In an embodiment, the second mediator (c2) has 1 to 4 polar substituents and preferably two polar substituents. In an embodiment, the second mediator (c2) comprises an aromatic 6-ring having two polar substituents and preferably hydroxy groups in a para position.

In an embodiment, the second mediator (c2) is an aromatic alcohol.

Examples of suitable second mediators (c2) include 4-(3-hydroxy-1-propenyl)-2-methoxyphenol, 4-hydroxybenzenemethanol, 4-hydroxybenzeneethanol, 3-hydroxybenzenemethanol, 2-hydroxybenzenemethanol, 4-hydroxybenzeneethanol, 4-benzylphenol, 2-benzylphenol, 2-(benzyloxy)ethanol, 4-(2-aminopropyl)phenol, α-(1-aminopropyl)benzenemethanol, α-aminopropyl)-benzyl alcohol, o-ethylphenol, m-ethylphenol, p-ethylphenol, 2,4-xylenol, 2,5-xylenol, 2,6-xylenol, 3,4-xylenol, 3,5-xylenol, benzeneethanol, α-methylbenzyl alcohol, 3-methylbenzenemethanol, 4-methylbenzenemethanol, p-methylaniline, 4-tert-butyl-1,2-benzenediol, p-1-acetyl-2,5-dihydroxybenzene, α-allylbenzenemethanol, 4-aminobenzeneethanol, 2-aminobenzenemethanamine, 2-aminobenzenemethanol, α-(1-aminoethyl)benzenemethanol, 4-(2-amino-1-hydroxyethyl)-1,2-benzenediol, α-(aminomethyl)benzenemethanol, 2-amino-4-methylphenol, 4-amino-2-methylphenol, 4-amino-3-methylphenol, 3-(aminomethyl)-3,5,5-trimethyl-cyclo-hexanol, α-(aminomethyl)benzenemethanol, α-(1-aminopropyl)benzenemethanol, 1,2-benzenedimethanol, 1,3-benzenedimethanol, 1,4-benzenedimethanol, benzeneethanol, benzenepentanol, benzenepropanol, 1,2,3-benzenetriol, 1,2,4-benzenetriol, 1,3,5-benzenetriol, p-benzidine, 1,1-bis(4-chlorophenyl)ethanol, 2,5-bis(1,1- dimethylpropyl)-1,4-benzenediol, 1-butoxy-4-methylbenzene, 2-tert-butyl-4,6-dimethylphenol, 4-tert-butyl-2,5-dimethylphenol, 4-tert-butyl-2,6-dimethylphenol, 1-tert-butyl-3,5-dimethyl-2,4,6-trinitrobenzene, 2-tert-butyl-4,6-dinitrophenol, 1-tert-butyl-3,5-dimethyl-2,4,6-trinitrobenzene, 2-tert-butyl-4,6-dinitrophenol, 4-tert-butyl-1,2-benzenediol, 2-tert-butyl-1,4-benzenediol, 2-tert-butyl-4,6-dimethylphenol, 4-tert-butyl-2,5-dimethylphenol, 4-tert-butyl-2,6-dimethyl-phenol, 2-tert-butyl-4-methoxyphenol, 3-tert-butyl-4-methoxyphenol, N,N-diethyl-2-methylaniline, 2,6-diisopropylaniline, 3,4-dimethoxybenzenemethanol, 2,5-dimethyl-1,3-benzenediol, 2,6-dimethyl-1,4-benzenediol, 4-dimethylbenzenemethanol, 1-(4-methylphenyl)ethanol, α, α-dimethylbenzenemethanol, α-cumyl alcohol, α-dimethylbenzenepropanol, 2-(1,1-dimethylpropyl)phenol, 4-(1,1-dimethylpropyl)phenol, 2-(hydroxymethyl)-1,4-benzenediol, 2-isopropylphenol, 3-isopropylphenol, 4-isopropylphenol, 4-methoxy-α-methylbenzenemethanol, 2-methylaniline, 3-methylaniline, 4-methylaniline, N-methylaniline, 3-methyl-1,2-benzenediol, 4-methyl-1,2-benzenediol, 2-methyl-1,3-benzenediol, 4-methyl-1,3-benzenediol, 5-methyl-1,3-benzenediol, 2-methyl-1,4-benzenediol, α-methylbenzenemethanol, 2-methylbenzenemethanol, 2-methyl-1,3-benzenediol, 4-methyl-1,3-benzenediol, 5-methyl-1,3-benzenediol, 2-methyl-1,4-benzenediol, 2-methylbenzeneethanol, 4-methylbenzeneethanol, 2-methylbenzenemethanamine, 3-methylbenzenemethan-amine, 4-methylbenzenemethanamine, N-methylbenzenemethanamine, α-methylbenzenemethanol, 2-methylbenzenemethanol, 3-methylbenzenemethanol, 4-methylbenzenemethanol, 3-methylbenzenemethanol, 4-methylbenzenemethanol, α-methylbenzenepropanol, α-ethylcyclohexanemethanol, 4-methylcyclohexanemethanol, 1-methylcyclohexanol, cis-2-methylcyclohexanol, trans-2-methylcyclohexanol, cis-3-methylcyclohexanol, trans-3-methylcyclohexanol, cis-4-methylcyclohexanol, trans-4-methylcyclohexanol, cis-2-methylcyclohexanol, trans-2-methylcyclohexanol, cis-3-methylcyclohexanol, trans-3-methylcyclohexanol, cis-4-methylcyclohexanol, trans-4-methylcyclohexanol, 1-methyl-4-isopropylcyclohexanol, 5-methyl-2-isopropylcyclohexanol, 5-methyl-2-isopropylcyclohexanol, 5-methyl-2-isopropylcyclohexanol, 5-methyl-2-isopropylcyclohexanol, 5-methyl-2-isopropylcyclohexanol, 2-(methylphenylamino)ethanol, 2-[(2-methylphenyl)amino]ethanol, 4-methyl-α-phenylbenzenemethanol, α-methyl-α-phenylbenzenemethanol, 2-(methylphenylamino)ethanol, 2-[(2-methylphenyl)amino]ethanol, 4-methyl-α-phenylbenzenemethanol, α-methyl-α-phenylbenzenemethanol, 3-pentadecylphenol, trans-5-(2-phenylvinyl)-1,3-benzenediol, 2,3,5,6-tetramethyl-1,4-benzenediol, 2,3,5-trim ethyl-1,4-benzenediol, 2,3,3-trimethyl-2-butanol, cis-3,3,5-trimethylcyclo-hexanol, trans-3,3,5-trimethylcyclohexanol, 2,3,4-trimethylphenol, 2,3,5-trimethylphenol, 2,3,6-trimethylphenol, 2,4,5-trimethylphenol, 2,4,6-trimethylphenol, and 3,4,5-trimethylphenol.

In an embodiment, the proportion of the first mediator (c1) in the unfilled composition, i.e. in the organic material, amounts to between 5 and 30% by weight. Preferred ranges include proportions of more than 8% by weight and of less than 20% by weight.

In an embodiment, the proportion of the second mediator (c2) in the unfilled composition, i.e. in the organic material, amounts to between 1 and 20% by weight. Preferred ranges include proportions of more than 2% by weight and of less than 10% by weight.

In an embodiment, the third mediator (d) is a hydrocarbon compound having at least one cyclic and preferably aromatic group that has at least one chlorine substitution.

The proportion of the third mediator (d) in the unfilled composition, i.e. in the organic material, can amount to between 3 and 20% by weight. Preferred volume fractions of the third mediator (d) comprise proportions of more than 5% by weight and less than 15% by weight.

In an embodiment, the third mediator (d) is an aromatic unsubstituted hydrocarbon.

Examples of suitable third mediators (d) include benzene, dimethylbenzene, 1,3,5-trimethylbenzene, 1,2,4-trimethylbenzene, 1,2,3-trimethylbenzene, p-ethyltoluene, m-ethyltoluene, o-ethyltoluene, isopropylbenzene, propylbenzene, p-xylene, m-xylene, o-xylene, ethylbenzene, 1,3,5-tri-tert-butylbenzene, (trichloromethyl)benzene, p-dichlorobenzene, hexamethylbenzene, hexylbenzene, 1,2,4,5-tetramethylbenzene, 1,2,3,4-tetramethylbenzene, 1,2,3,5-tetramethylbenzene, o-ethyltoluene, p-ethyltoluene, 1,2,3-trimethylbenzene, 1,2,4-trimethylbenzene, 1,3,5-trimethylbenzene, propylbenzene, isopropylbenzene, o-ethyltoluene, p-ethyltoluene, ethylbenzene, o-xylene, m-xylene, p-xylene, cyclohexane, methylcyclopentane, trimethylbenzene, i-sopropenylbenzene, m-diethylbenzene, p-diethylbenzene, sec-butylbenzene, tert-butylbenzene, isobutylbenzene, isopropylbenzene, o-ethyltoluene, m-ethyltoluene, p-ethyltoluene, 1,2,3-trimethylbenzene, 1,2,4-trimethylbenzene, 1,3,5-trimethylbenzene, allylbenzene, (trans)-1,3-butadienylbenzene, 1-tert-butyl-3,5-dimethylbenzene, butylbenzene, sec-butylbenzene, tert-butylbenzene, 1-tert-butyl-2-methylbenzene, 1-tert-butyl-3-methylbenzene, 1-tert-butyl-4-methylbenzene, 1-tert-butyl-4-ethylbenzene, 1-tert-butyl-2-methyl-benzene, 1-tert-butyl-3-methylbenzene, 1-tert-butyl-4-methylbenzene, cyclopentylbenzene, cyclopropylbenzene, decylbenzene, 1,2-diethylbenzene, 1,3-diethylbenzene, 1,4-diethylbenzene, 1,2-diisopropylbenzene, 1,3-diisopropylbenzene, 1,4-diisopropylbenzene, 1-ethyl-2,4-dimethylbenzene, 1-ethyl-3,5-dimethylbenzene, 2-ethyl-1,3-dimethylbenzene, 1-isopropyl-2-methylbenzene, 1-isopropyl-3-methylbenzene, 1-isopropyl-4-methylbenzene, 1-methyl-3-propylbenzene, 1-methyl-4-propylbenzene, cis-1-propenylbenzene, cis-1-propenylbenzene, trans-1-propenylbenzene, 1,2,3,4-tetramethylbenzene, 1,2,3,5-tetramethylbenzene, 1,2,4,5-tetramethylbenzene, 1,2,3,4-tetrahydronaphtalin and bicyclo [4.4.0]decane.

The weight proportion of the polyolefin (a) in the organic material results from the difference between the sum of the portions of the further additives and 100% by weight.

Further suitable esters include fatty acid esters. Fatty acid esters can, for example, have an influence on the melt viscosity drop of the plastic composition and/or can serve the pretreatment of the filler material (e). Further suitable additives include alkyl silanes. Further suitable additives include organic titanates, organic phosphonates, and organic phosphates. Each of these additives can, for example, be present in the composition in an amount between 0.1 and 5 vol. %.

Against the initially named background, the invention further relates to a method of manufacturing a filled plastic composition in accordance with the invention comprising the steps: A. suspending the filler material (e) in a solvent; B. mixing the salt (b), the first mediator (c1) and optionally the second mediator (c2) into the suspension; C. drying the suspension for removing the solvent; D. mixing the residue with the polyolefin (a); and E. adding the third mediator (d).

A reaction phase can follow the admixing in accordance with step B. prior to the drying in accordance with step C. The duration of this phase can amount to between 10 minutes and 2 hours, for example. Room temperature or also an elevated temperature can be selected as the temperature. An agitation of the suspension, by stirring for example, can take place during the reaction phase. Provision can alternatively be made that the suspension is stationary during the reaction phase.

The mixing in accordance with step D. can take place in the dry state, with the powdery, optionally previously ground residue from step C. being mixed with powder or granulated polyolefin (a). A mixing in the molten state of the polyolefin (a) is furthermore conceivable.

In an embodiment, the mixing in accordance with step D. is followed by a compounding in the molten state, a cooling and a comminution.

The addition of the third mediator (d) in accordance with step E. can take place by spraying the comminuted dry mixture with the third mediator (d).

Suitable solvents comprise weakly polar to apolar solvents.

Suitable solvents include polar solvents, for example aprotic polar solvents such as acetone or protic polar solvents such as ethanol.

The invention finally relates, against the initially named background, to the use of a highly filled plastic composition in accordance with the invention for manufacturing a molding as part of an extrusion process or injection molding process.

The present invention provides the possibility of achieving a degree of volume filling of the filler material in the polyolefin in a sensible manner from a technical processing and mechanical aspect that is very close to the theoretically maximum packing density of the native filler material powder particles. Specific physical properties of the filler material such as magnetic properties or thermal conductivity can thus have a very strong effect in the plastic composition so that new areas e.g. in metal replacement can be opened up.

Further details and advantages of the invention will be explained in the following with reference to the prior art, to the demands made and to the presumed kind of cooperation of the filler material particles and the matrix. It must be noted here that these embodiments have an explanatory meaning and not a restrictive one, for example with regard to the required presence of a specific substance.

The compositions in accordance with the invention can be considered in an embodiment as a thermoplastic, organically modified plastic composition for the manufacture of highly packed plasticizable plastic-bonded powders/fibers/carbon nanotubes, whiskers or highly filled thermoplastics as a material for injection molding, extrusion, and similar processes. Applications include plastics having improved physical properties such as thermal conductivity, magnetic phenomena, high density, attenuation of ionizing radiation, screening from radio frequency and the effect of abrasion, and feedstocks for MIM and CIM processes as well as 3D printing processes.

Such materials have to satisfy different demand profiles in dependence on the application. Examples include those named in the following. A modified polymer system for this application has to satisfy the following demands in the completed component. It provides the material with its mechanical properties such as tensile strength, modulus of elasticity, durability, temperature resistance, hardness, and abrasion resistance. These demands apply both to the polymer per se and to the binding to the powdery/fibrous filler material. It must be chemically resistant with respect to environmental conditions and the process and application conditions. It must plasticize the total material sufficiently, also at very high packing or at high degrees of filling and must enable a complex shape typical for plastic injection molding both during the compounding of the material and during the component manufacture. Equally, a layer must be produced on the adhesion/bond associated filler material surface that has excellent lubrication properties and withstands very high pressures. It must have a very low melt viscosity that is substantially lower than that of the native polymer. It must be able to compensate the difference in the packing density between the filler material in flow movement and the filler material resting in the very dense packing by a temporary volume increase. The solidification and crystallization behavior may not generate internal stresses that are too high in the component. Despite the strong bonding to the filler material particles in the heat under plasticization conditions, an easy demolding capability out of the tool must be ensured under solidification conditions.

In the prior art, the theoretically maximum achievable packing density of the powder is currently not even only approximately reached in the above-named applications with any material. The polymer preparations on the basis of polyolefins at best enable contents with globular monomodal powders that are ≥10 vol. % below the values of approximately 65 vol. % packing density with monomodal powders d90<45 μm which can be calculated in accordance with the formula of LEE for particle size distributions. The values are even further removed with irregular morphologies, e.g. spaltered or plate-like morphologies. There is generally both a significant deterioration of the flow properties in the processing in injection molding and in particular of the mechanical properties from as early as >55 vol. % powder portion with the above-named powders since the bonding of the polymer to the powder surface is not sufficiently strong. The limit for tungsten screening materials at a density of 11 $g/cm^3$ is therefore currently at the screening power of lead (14 g/cm3 with a screening power >50% above lead should be possible) or the heat conductivity of an isotropic thermal conductivity plastic at 2-3 W/mK (10-15 W/mK should be possible according to Lewis & Nielsen on reaching the theoretical packing density). The same disproportion is also present in permanently magnetic and soft magnetic materials whose mechanical strengths additionally drop by a large amount. In the examples named as exemplary of the density previously achieved and achievable in accordance with the invention, the degree of volume filling increase amounts to approximately 9 vol. %, but the absolute volume of the filler material increases by close to 50% in the unchanging plastic volume, however. Synthetic resins for molding materials and casting materials and, recently chain-shortened polyolefins, achieve slightly better values.

Polyolefins are used in accordance with the present invention. There is great commercial interest in highly filled compositions based on polyolefins. With the selected filler materials, above all polar materials such as metal and metal oxide powder as well as oxide ceramic powder and optionally non-oxide ceramic powder are considered, but particularly for the apolar polyolefins, apolar filler materials such as graphite, graphene, or carbon nanofiber are also of interest. A modular system of selected organic additives has been developed for highly filled thermoplastics to modify the base polymer. This enables the production of highly packed plasticizable plastic-bonded powders or of highly filled thermoplastics as materials for injection molding, extrusion and similar processes. The modular system enables the direct influencing of singular and multiple properties of the modified plastic both during the component manufacture and in the completed component. This invention is thus delineated from the developments of recent works that have attempted to lower the viscosity of the filled plastics by the use of multimodal powder mixtures. Since the flow improvements here only allow an increase of the packing density, the physical properties degrade since the degree of volume filling cannot be increased to the same degree since the polymer melt lacks wetting capacity and lubrication film volume.

The properties of adhesion/bonding, viscosity, volume, strength, impact resistance, sliding or demolding can be set in a modular manner, with them not only being combined in a singular manner, but also in a multiple manner and at times synergistically. The melt viscosity of polar polymers is no longer sufficient for the implementation of high packing levels with a sufficiently complete and simultaneously movable wetting. Said melt viscosity has to be greatly reduced without a permanent loss of the molecular structure and without a drop of the force of adhesion/bonding at hydrophilic surfaces. In the sense of this invention, this is initially done by partial substitution of the highly viscous polymer melt viscosity having low-viscous solvent viscosity and salt melt viscosity of suitable protic solvents and organic salts that are thermodynamically compatible with the polymer melts with respect to their boiling points and melting points. The viscosity obtained is substantially lower. The wetting capacity of a given melt volume thus increases a lot. To further increase the wetting capacity and to increase the lubrication film volume, the melt volume is furthermore simultaneously temporarily greatly increased, with primarily the melt volume of the liquid phase being increased whose volume growth is a requirement for the additional introduction of a secondary defined gas volume that additionally inflates the primarily generated liquid volume by the gas volume portion.

The exact function of the dissolving of the polymers is not looked at in more detail here since it is basically known and is only used in an innovative manner here. The greater polarity of the additives in a suitable solution is in particular used, beyond the very high viscosity-reducing effect, to obtain a large increase in the adhesive force toward the polar filler material by the diffusion-controlled lowering of the cohesive force of the polymer. The polyolefin melts requires first mediators and from case to case also second mediators as defined above whose melting points are in the vicinity of the melting temperature. The melt volume of the polymer can be greatly increased by high volume fractions of these alcohols in the polymer.

The first mediator additionally acts as a plasticizer for the polyolefins and thanks to their amphiphilic properties improve the adhesion between polar filler materials and the apolar or weakly polar matrix and thus the incorporation of filler material particles by promoting the penetration of the polymer chains within the particle structure of the filler material. The second mediator, if admixed, can furthermore demonstrate amphiphilic effects since it is more polar than the first mediator and can improve the adhesion to polar filler material particles. The polar substituents should, however, preferably be oriented such that they do not enter into any intramolecular associations. A smaller volume fraction of third mediator added in the liquid state, but that is gaseous under melting conditions, results in a further volume increase. The solvents additionally have a newly recognized effect on the impact resistance. The plasticizing effect of the condensed solvent phase in the solidified polymer has a similar effect to an elastomer. The miscibility and homogenization of the polyolefin melts with the alcohol melts is improved by the addition of the fatty acid salts. The salts additionally act as lubricant at high temperatures and as demolding means at lower temperatures. They furthermore have a strength-promoting effect on crystallization.

Further details and advantages of the invention result from the following described embodiment.

EMBODIMENT 34.1 parts by volume of aluminum powder are added to 41.8 parts by volume of acetone in a suitable vessel and are stirred well. An aluminum powder having the following grain size classification is used as the aluminum powder: d5<10 µm, d10<15 µm, d20<20 µm, d50<25 µm, d70<30 µm, d80<35 µm, d100<145 µm. 1.1 parts by volume of sodium oleate, 3.3 parts by volume of triphenylmethanol, and 1.1 parts by volume of 4-hydroxybenzenemethanol are added to this suspension, are stirred and left at room temperature for 30 min.

The suspension is subsequently dried.

The dried mixture is subsequently mixed with 15.4 parts by volume of HD polyethylene by stirring. HD polyethylene has a degree of crystallinity of <90% and a mean molar mass of <150,000 g/mol. 3.2 parts by volume of dimethyl benzene are sprayed onto this powder mixture. The total mixture is homogeneously mixed by stirring in a simple mixer.

The obtained powdery composition is compounded in a sigma kneader and granulated in a mill ready for injection molding.

As a result, a thermoplastic injection-moldable composition of HD polyethylene and aluminum powder having a filler material portion of 62 vol. % is obtained. The theoretically maximum filler material portion on the use of said powder would amount to 65% by volume.

A cylindrical disk as per DIN is injection molded and is subjected to a thermal conductivity measurement according to the hot disk method (ISO 22007-2 at normal pressure and at 21° C.) at the Linseis THB-100 to test the molded components obtainable from this composition. The thermal conductivity measured (that is isotropic due to the isometric filler material) amounted to 8 W/mK.

Selected mechanical properties (elongation at break, strength, hardness) were significantly better on a qualitative comparison for the embodiment with other highly filled materials known on the market. The high filling and the good thermal conductivity are therefore less to the disadvantage of these mechanical properties than with known materials.

The invention claimed is:

1. A highly filled plastic composition comprising:
    (a) at least one polyolefin;
    (b) at least one metallic salt of an unsaturated aliphatic fatty acid;
    (c1) at least one first mediator which is a hydrocarbon compound having at least one cyclic group and having at least one polar substituent comprising an oxygen atom and/or nitrogen atom, wherein the first mediator comprises at least two and at most ten cyclic groups per polar substituent, and wherein the melting point of the first mediator is no more than 80° C. below and no more than 50° C. above the melting point of the polyolefin (a);
    (c2) optionally at least one second mediator which is different from the first mediator
    (c1) and is a hydrocarbon compound having at least one cyclic group and having at least one polar substituent comprising an oxygen atom and/or nitrogen atom, wherein the second mediator comprises fewer than two cyclic groups per polar substituent and at least two and at most ten polar substituents per cyclic group, and wherein the melting point of the second mediator is no more than 80° C. below and no more than 50° C. above the melting point of the polyolefin (a); and (d) at least one third mediator which is a hydrocarbon compound having at least one cyclic group which is unsubstituted or halogen-substituted, wherein the boiling point of the third mediator is no more than 100° C. below and no more than 80° C. above the melting point of the polyolefin (a); and (e) at least one particulate filler material;

wherein the proportion of the filler material (e) amounts to more than 40 vol.% measured at the total volume of the filled composition and/or more than 80 vol.% of the theoretical maximum.

2. The highly filled plastic composition in accordance with claim 1, wherein the melting point of the first mediator (c1) and/or the melting point of the second mediator (c2) is no more than 50° C. below and/or no more than 30° C. above the melting point of the polyolefin (a); and/or in that the boiling point of the third mediator (d) is no more than 70° C. below and/or no more than 50° C. above the melting point of the polyolefin (a).

3. The highly filled plastic composition in accordance with claim 1, wherein the filler material (e) is a metal powder, a metal oxide powder, an oxide ceramic powder, a non-oxide ceramic powder, a carbon powder, or a combination thereof; or in that the filler material (e) comprises a metal powder, a metal oxide powder, an oxide ceramic powder, a non-oxide ceramic powder, a carbon powder, or a combination thereof.

4. The highly filled plastic composition in accordance with claim 1, wherein the average grain diameter of the filler material(s) is between 1µm and 150 p.m.

5. The highly filled plastic composition in accordance with claim 1, wherein the polyolefin (a) has an average molar mass of between $10^4$ and $10^6$ g/mol; and/or in that the melting point of the polyolefin (a) is between 100° C. and 250° C.

6. The highly filled plastic composition in accordance with claim 1, wherein characterized in that the fatty acid of the salt (b) is a monovalent carboxylic acid having more than 8 carbon atoms and having at least one double bond.

7. The highly filled plastic composition in accordance with claim 1, wherein characterized in that the portion of the salt (b) amounts to between 1 and 15% by weight, measured at the total mass of the composition without filler material.

8. The highly filled plastic composition in accordance with claim 1, wherein the first mediator (c1) and/or the second mediator (c2) comprises/comprise hydroxy groups and/or amino groups, preferably hydroxy groups, as polar substituents.

9. The highly filled plastic composition in accordance with claim 1, wherein the proportion of the first mediator (c1) amounts to between 5 and 30% by weight, measured at the total mass of the composition without filler material; and/or in that the proportion of the second mediator (c2) amounts to between 1 and 20% by weight, measured at the total mass of the composition without filler material.

10. The highly filled plastic composition in accordance with claim 1, wherein the proportion of the third mediator (d) amounts to between 3 and 20% by weight, measured at the total mass of the composition without filler material.

11. A method of producing the highly filled plastic composition in accordance with claim 1, said method comprising the following steps:

A. suspending the filler material (e) in a solvent;
B. mixing the salt (b), the first mediator (c1) and optionally the second mediator (c2) into the suspension;
C. drying the suspension for removing the solvent; and
D. mixing the residue with the polymer (a); and
E. adding the third mediator (d).

12. The highly filled plastic composition of claim 1, wherein one or more of the first mediator, the second mediator, and the third mediator is an aromatic group.

13. The highly filled plastic composition of claim 7, wherein the portion of the salt (b) amounts to between 3 and 7% by weight.

14. The highly filled plastic composition in accordance with claim 1, wherein the first mediator (c1) and/or the second mediator (c2) comprises hydroxyl groups as polar substituents.

15. The highly filled plastic composition in accordance with claim 9, wherein the proportion of the first mediator (c1) amounts to between 8 and 20% by weight, measured at the total mass of the composition without filler material.

16. The highly filled plastic composition in accordance with claim 9, wherein the proportion of the second mediator (c2) amounts to between 2 and 10% by weight, measured at the total mass of the composition without filler material.

17. The highly filled plastic composition in accordance with claim 10, wherein the proportion of the third mediator (d) amounts to between 5 and 15% by weight, measured at the total mass of the composition without filler material.

* * * * *